United States Patent
Brockmann et al.

(10) Patent No.: US 6,745,322 B1
(45) Date of Patent: Jun. 1, 2004

(54) APPARATUS AND METHOD FOR CONDITIONALLY FLUSHING A PIPELINE UPON A FAILURE OF A TEST CONDITION

(75) Inventors: Russell C Brockmann, Ft Collins, CO (US); Patrick Knebel, Ft Collins, CO (US); Kevin David Safford, Fort Collins, CO (US); Rohit Bhatia, Fort Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/507,505

(22) Filed: Feb. 18, 2000

(51) Int. Cl.$^7$ ................................................. G06F 9/44
(52) U.S. Cl. .................................................... 712/239
(58) Field of Search ................................. 712/233, 234, 712/238, 239, 240

(56) References Cited

U.S. PATENT DOCUMENTS

| | | | | |
|---|---|---|---|---|
| 4,430,706 A | * | 2/1984 | Sand | 712/237 |
| 4,853,840 A | * | 8/1989 | Shibuya | 712/237 |
| 5,704,054 A | * | 12/1997 | Bhattacharya | 712/212 |
| 5,859,999 A | | 1/1999 | Morris et al. | 395/565 |
| 5,860,017 A | | 1/1999 | Sharangpani et al. | 395/800.23 |
| 5,954,814 A | * | 9/1999 | Zaidi et al. | 712/227 |
| 6,021,489 A | * | 2/2000 | Poplingher | 712/239 |
| 6,088,793 A | * | 7/2000 | Liu et al. | 712/239 |

OTHER PUBLICATIONS

Wolfe, A., "Patents shed light on Merced's Innards", Electronic Engineering Times, Feb. 15, 1999.

* cited by examiner

Primary Examiner—David Wiley
Assistant Examiner—Scott M. Collins (57) ABSTRACT

A method and apparatus that utilizes a simple test and flush mechanism to implement branch instructions of one Instruction Set Architecture (ISA) using instructions of another ISA is described. During the decoding and sequencing of microinstructions to implement a branch instruction, a fix-up address, which represents the remedial branch target in the event of a mispredicted target or branch condition, is determined and stored. A test condition is set to determine if the prediction or the branch condition was correct. When the test condition fails, the instruction execution pipeline is immediately flushed to avoid executing any instruction remaining in the pipeline following the branch instructions. The flushing of the pipeline signals the instruction fetch control mechanism to redirect the instruction flow to the instruction corresponding to the fix-up address. A method and apparatus according to the present invention further allows flushing of the pipeline when conditions other than ones involved in branch instructions occurs, e.g., to flush stale instructions.

18 Claims, 5 Drawing Sheets

APPARATUS AND METHOD FOR CONDITIONALLY FLUSHING A PIPELINE UPON A FAILURE OF A TEST CONDITION

TECHNICAL FIELD

The invention relates to computers and microprocessor architectures. Particularly, this invention relates to emulation of an instruction set architecture (ISA) using another instruction set architecture. More particularly, this invention relates to a method of and apparatus for emulating branch instructions of an instruction set architecture using instructions from another instruction set architecture.

BACKGROUND ART

Designing of a microprocessor architecture includes the provisioning of a set of basic instructions (typically referred to as the "instruction set") that comprises the basic building block instructions, e.g., the instructions that manipulate register contents and/or movement of data between registers. An Instruction Set Architecture (ISA) refers to the design of the instruction set of the microprocessor architecture.

A particular ISA may be better than other ISAs in some respect, e.g., providing a wider range and richer instruction set to promote easier programming, while being inferior in some other respect, e.g., requiring a complex hardware to support the more complex and greater number of instructions in the instruction set. Thus, selecting the most suitable ISA may be one of the most significant aspects of a computer architecture.

Figure 1:
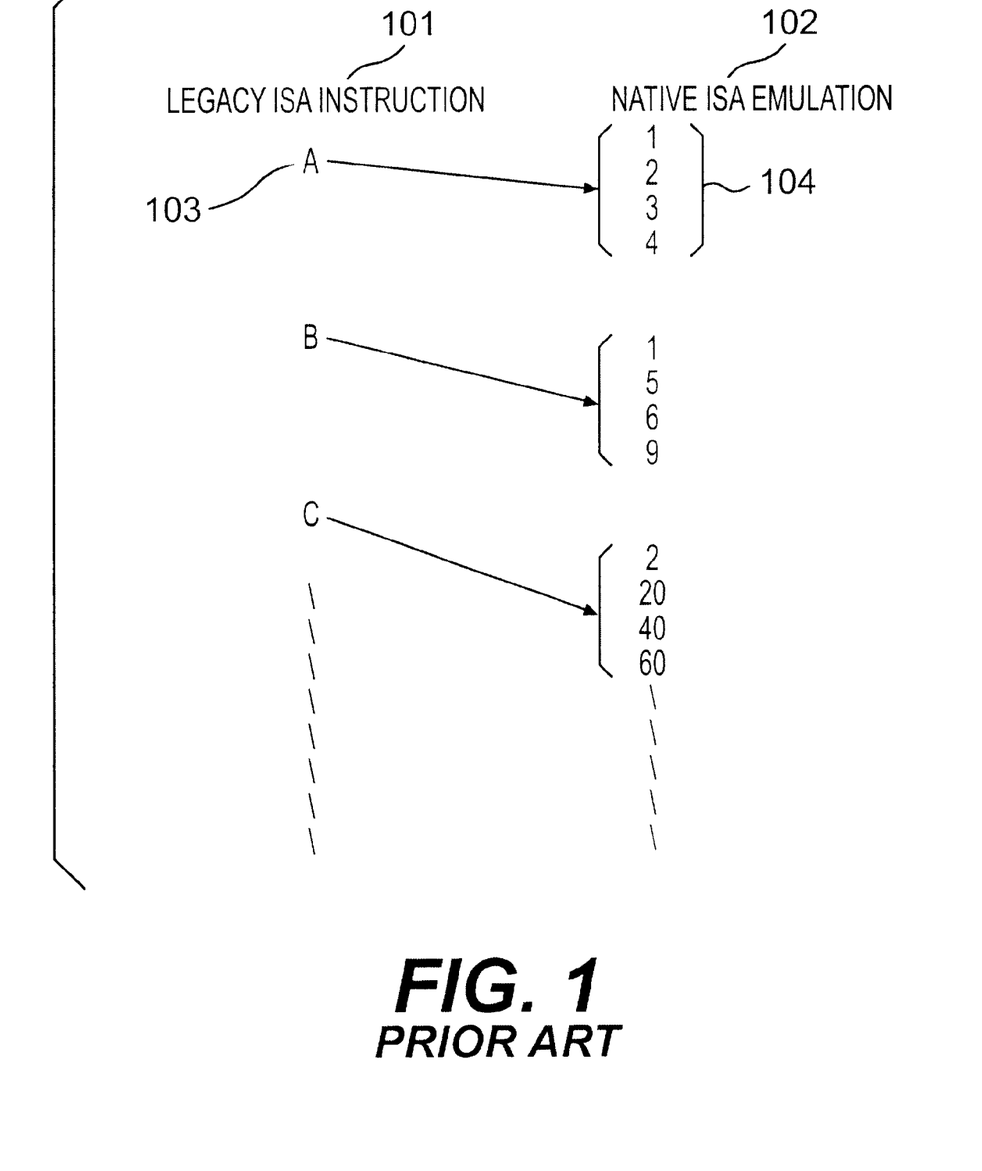
FIG. 1 is an illustrative diagram of an exemplary conventional emulation of legacy ISA macroinstructions using sequences of native ISA microinstructions.

Even when a new ISA is employed to realize the benefits associated thereto (e.g., improved performance), some newer computer architectures are provided with the capability to run legacy applications that were written for a legacy ISA (which may represent a substantial capital investment). Typically this is done by emulating the instructions of the legacy instruction set with a series of one or more instructions of the native ISA. For example, as shown in FIG. 1, an instruction of the legacy instruction set 101, referred to hereinafter as "microinstructions", (e.g., the instruction A 103), is expanded into, or emulated by, a sequence of the native ISA instructions 102, referred to hereinafter as "microinstructions", (e.g., the sequence 104 (or a "flow") of instructions 1–4). The microinstructions may be generated by a decoder/sequencer of the emulation hardware (not shown).

Unfortunately, an emulation of the legacy ISA instructions as described above usually results in an increased number of instructions executed and/or requires elaborate and complex additional hardware due at least in part to the differences in the semantics between instructions of the legacy ISA and the native ISA.

This is particularly true for emulation of a branch instruction. Because the branch semantics, (e.g., target prediction and/or branch conditions, etc.) between the legacy ISA and the native ISA may be significantly different, it is often not possible to map a macroinstrcution branch with a single microinstruction. Consequently, multiple microinstructions are needed to implement a macroinstrcution-branch, further increasing the number of instructions that must be executed, and thus reducing the performance of the computer system.

Figure 2:
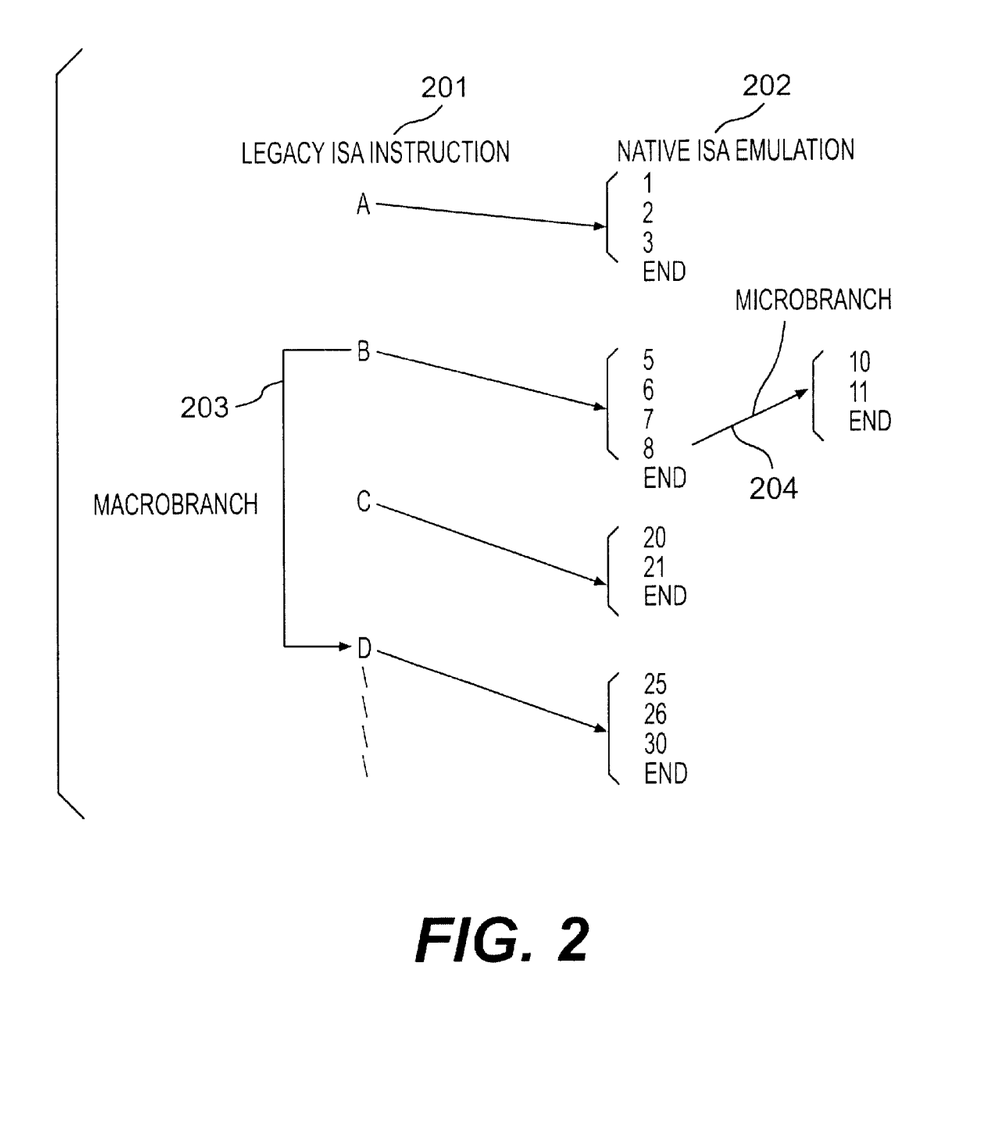
FIG. 2 is an illustrative diagram of an exemplary emulation of legacy ISA macroinstructions using sequences of native ISA microinstructions, including macrobranch instructions and microbranch instructions.

Moreover, the branch target prediction of a macroinstruction branch at the time the flow of microinstructions is generated by the decoder/sequencer of the emulation mechanism, is not always accurate. In particular, for example, FIG. 2 shows a number of microinstructions A, B, C, D, etc., 201 being emulated by the microinstructions 202. The macroinstruction B may be a branch instruction, e.g., branch to D. The branching may be unconditional, i.e., the macroinstruction D is executed following the retirement of the macroinstruction B, or it may be conditional, i.e., branch to D only when a given condition is met, and otherwise proceed to the next instruction C if the condition is not met. A macroinstruction branch, e.g. the branch 203, is referred to hereinafter as a macrobranch.

On the other hand, the microinstruction 7 may be a branch instruction, in which based on a condition being met, may take one of several possible flow paths. For example, if the condition is met, after the microinstruction 7 is executed, instructions 10 and 11 may be executed next before the particular flow to emulate the macroinstruction B ends. On the other hand, if the condition was not met, then the flow may continue on to instruction 8 before it ends. A microinstruction branch, e.g., the branch 204, is referred to hereinafter as a microbranch.

The decoder/sequencer of the native hardware generally is not able to generate the branch target of a macrobranch, e.g., the macrobranch 203, when the macroinstruction, e.g., instruction B, is decoded. This is because, the target prediction semantics and/or hardware of the two ISAs are very different from each other. For example, the target may be stored in a register in a microbranch instruction, and may be specified within the instruction itself for a macrobranch. Moreover, the instruction lengths of the two ISAs may be different, making it difficult for the hardware of one ISA to determine where, in the instruction of the other ISA, the branch target is specified.

Because the decoder/sequencer is unable to calculate the correct target of a macrobranch, additional hardware must be added to ensure that the decoder/sequencer does not fill the execution pipeline of the computer system with erroneous macroinstructions fetched according to the native ISA prediction mechanism, and allow the legacy ISA emulation fetch engine to calculate and branch to the correct target.

Furthermore, the differences in the ISAs make it difficult to share the same branch prediction hardware. Extra hardware would be required to ensure that predictions made during the execution of the native instruction set and during the execution of the emulated instruction set do not effect each other.

Thus, in order to emulate a branch instruction of one ISA using the instructions of the other ISA, new instructions and additional hardware must be added to handle the different semantics used by the other ISA, negatively impacting the physical layout size requirement and/or performance of the system.

In addition, it may be desirable to have a mechanism to facilitate microbranches that re-steer the execution path of a particular microinstruction flow independent from any macroinstruction branches. For instance, the instruction decoder/sequencer, while expanding a macroinstruction into a corresponding microinstruction flow, may require the ability to select a different flow path (e.g., the microinstruction 7 as shown in FIG. 2) based, e.g., on the value of a bit in a register. The instruction/decoder would need this ability in order to conserve the number of microinstructions required to implement the macroinstruction.

However, because of the differences in the remedial actions required in the event of mispredictions, and in order to ensure that the microbranches do not affect the predictions made by the macrobranch prediction mechanism, there must be additional hardware components added to distinguish between the microbranches and the macrobranches.

Moreover, performing these predicted microbranches requires the ability to, in the event of misprediction of the target, flush the execution pipeline and to redirect the sequencer/decoder to proceed through a different flow path. To this end, an event, e.g., a fault condition, may be inserted into the pipeline, which will cause the pipeline to be flushed if a target of a microinstruction branch is mispredicted (or be ignored if the target is correctly predicted).

However, due to timing delays caused by the detection of the misprediction, signaling the misprediction to the legacy ISA emulation control block, then injecting the flush event back into the pipeline, it becomes necessary to add extra "padding" instructions after the branch instruction, or otherwise provide a mechanism, to avoid execution of any subsequent instructions that should not be executed in the event of misprediction. The padding instructions reduce the performance of the system.

Furthermore, there are times when it is desirable to restart fetching anew, independent from any branching instructions. For instance, when a retiring instruction has changed instruction fetch resources, affecting the fetching of the instructions subsequent to the retiring instruction—referred to herein as a stale instruction—, the pipeline may need to be completely flushed, and filled with new instructions in light of the resource update.

Thus, there is a need for an efficient branch mechanism that does not require substantial new hardware and/or new instructions to implement macrobranches and/or microbranches.

There is also a need for an efficient branch mechanism that causes a pipeline flush immediately upon a mispredicted branch. This is needed to avoid execution of any instructions that may be present in the pipeline, without the delay in detecting and signaling the misprediction to, and waiting for a response from, the instruction fetch control mechanism.

There is also a need for an efficient branch mechanism which ensures that a branch operation for a macrobranch does not affect the flow of microinstructions, and that a microbranch does not affect the proper fetching of macroinstructions.

There is a further need for an efficient branch mechanism that does not require an addition of complex hardware for branch predictions and/or control of macrobranches.

There is also a need for a mechanism to flush any stale instructions in the instruction pipeline whenever desired, e.g., when fetch resources are changed by an earlier retired instruction.

SUMMARY OF INVENTION

A method and apparatus for implementing branch instructions in a computer system is described. More particularly described is a method of, and an apparatus for, implementing a branch instruction in a computer system having an execution pipeline which comprises the steps of, and means for, setting a test condition representing the correctness of a predicted target and/or whether a branch condition is met, and flushing the execution pipeline immediately upon a failure of the test condition.

Also described is a method of executing instructions in a microprocessor having an execution pipeline which comprises providing an instruction set having a conditional flush instruction that flushes the execution pipeline immediately upon a failure of a predetermined condition.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof, particularly with references to an example with a specific circuit design implementation. However, one of ordinary skill in the art would readily recognize that the same principles are equally applicable to, and can be implemented in, any circuit design substantially performing the invention described herein, and that any such variation would be within such modifications that do not depart from the true spirit and scope of the present invention.

A simple test and flush mechanism to implement branch instructions of at least two distinct ISAs, e.g., a Complex Instruction Set Computing (CISC) architecture and a Reduced Instruction Set Computing (RISC) architecture, is provided.

During the decoding and sequencing of microinstructions to implement a branch instruction, a fix-up address, which represents the remedial branch target in the event of a mispredicted target or branch condition, is determined and stored. For example, the remedial branch target may be the branch target if the branch has actually occurred when it was wrongly predicted that the branch would not occur. The remedial branch target may be the next sequential instruction address if the branch did not take place despite the contrary prediction.

A test condition is set to determine if the prediction or the branch condition was correct. An instruction that tests the test condition, and immediately flushes the pipeline when the test condition fails, is fed into the instruction execution pipeline. This instruction causes an immediate flushing of any subsequent instructions remaining in the pipeline, thus preventing any instructions that should not be executed in the event of the mispredicted branch from being executed.

The flushing of the pipeline signals the instruction fetch control mechanism to redirect the instruction flow to the instruction corresponding to the fix-up address. A method and apparatus according to the present invention further allows flushing of the pipeline for conditions other than ones involved in branch instructions, e.g., to flush a stale instruction.

Figure 3:
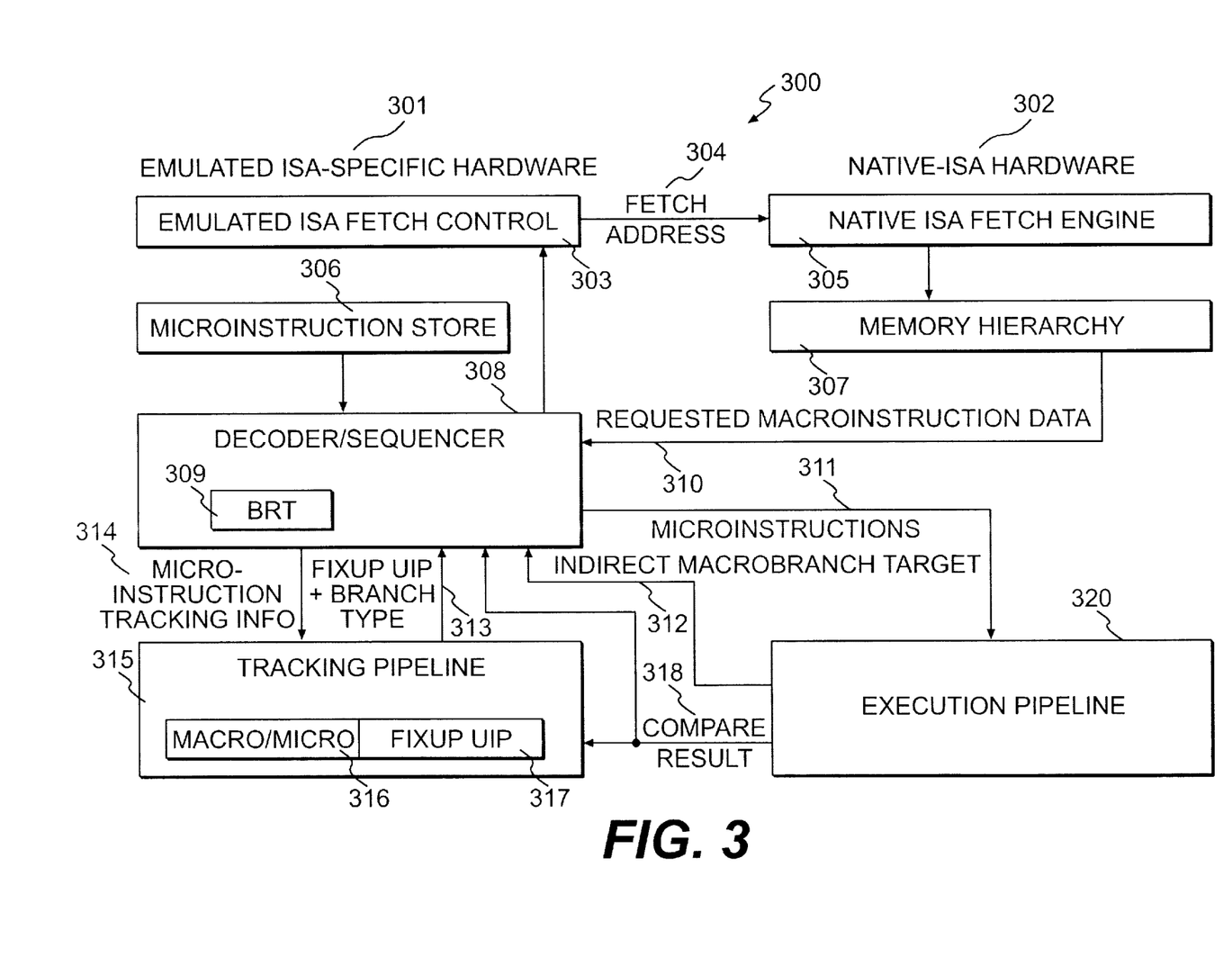
FIG. 3 is a block diagram of the relevant portions of the computer system implementing an exemplary embodiment of an emulation of legacy ISA macroinstructions using sequences of native ISA microinstructions in accordance with the principles of the present invention.

In particular, FIG. 3 shows the relevant portions of an exemplary embodiment of the present inventive computer system 300 capable of emulating the legacy ISA macroinstructions using sequences of the native ISA microinstructions. The system 300 includes, inter alia, an emulated ISA-specific hardware 301 to emulate legacy ISA instructions using the native ISA instructions, and a native ISA hardware 302 to implement the native ISA. A legacy program written for a legacy ISA computer system may comprise a series of legacy ISA instructions, i.e., a series of macroinstructions, which may be stored in a memory hierarchy 307, which can be any data storage device, e.g., a RAM, ROM, hard disk, or the like. In the emulation mode, macroinstructions are fetched from the memory hierarchy 307 by the native ISA fetch engine 305 based on the fetch addresses 304 received from the emulated ISA fetch control 303. Once fetched, the macroinstruction is decoded by the Decoder/Sequencer 308 based on the macroinstruction data 310 received from the memory hierarchy 307. The Decoder/Sequencer 308 retrieves, from the microinstruction store 306, one or more microinstructions corresponding to the decoded macroinstruction, and generates the sequence of execution (or the "flow") of the retrieved microinstructions to implement (or emulate) the macroinstruction.

The sequence of the retrieved microinstructions are fed to the execution pipeline 320 of the native ISA via the microinstructions path 311, and proceed through the stages of the pipeline 320, and are executed in a pipelined manner well known to those familiar with computer architectures.

The tracking pipeline 315 tracks microinstruction tracking information 314 received from the decoder/sequencer 308. The microinstruction tracking information 314 comprises, in relevant part, inter alia, a macro/micro field 316 and a fix-up microinstruction pointer (UIP) field 317. The fix-up microinstruction pointer (UIP) field 317 contains a remedial microinstruction target in the event of a mispredicted microbranch. During an execution of the test and flush instruction in accordance with the principles of the present invention, the macro/micro field 316 indicates whether the instruction being executed is for a microbranch or for a macrobranch.

During execution of a branch instruction as implemented in accordance with the principles of the present invention, the conditional flush mechanism (as will be described below in more detail) causes the compare result signal 318 to be sent to the tracking pipeline 315 and to the decoder/sequencer 308. In addition, for indirect macrobranches, the correct macrobranch target 312 is sent to the BRT 309 in the decoder/sequencer 308. The tracking pipeline 315 in turn sends branch type information 316 and, for microbranches, the fix-up UIP 317, to the decoder/sequencer 308 via the signal path 313.

If the compare result signal 318 indicates a branch misprediction has occurred, the decoder/sequencer uses the branch type information 316 to select between the fix-up UIP 317 (for microbranches) and the BRT 309. If a microbranch misprediction is indicated, the decoder/sequencer 308 starts sending microinstructions from the microinstruction store 306. If a macrobranch misprediction is indicated, the decoder/sequencer 308 sends the correct macroinstruction address from the BRT 309 to the emulated ISA fetch control 303.

Figure 4:
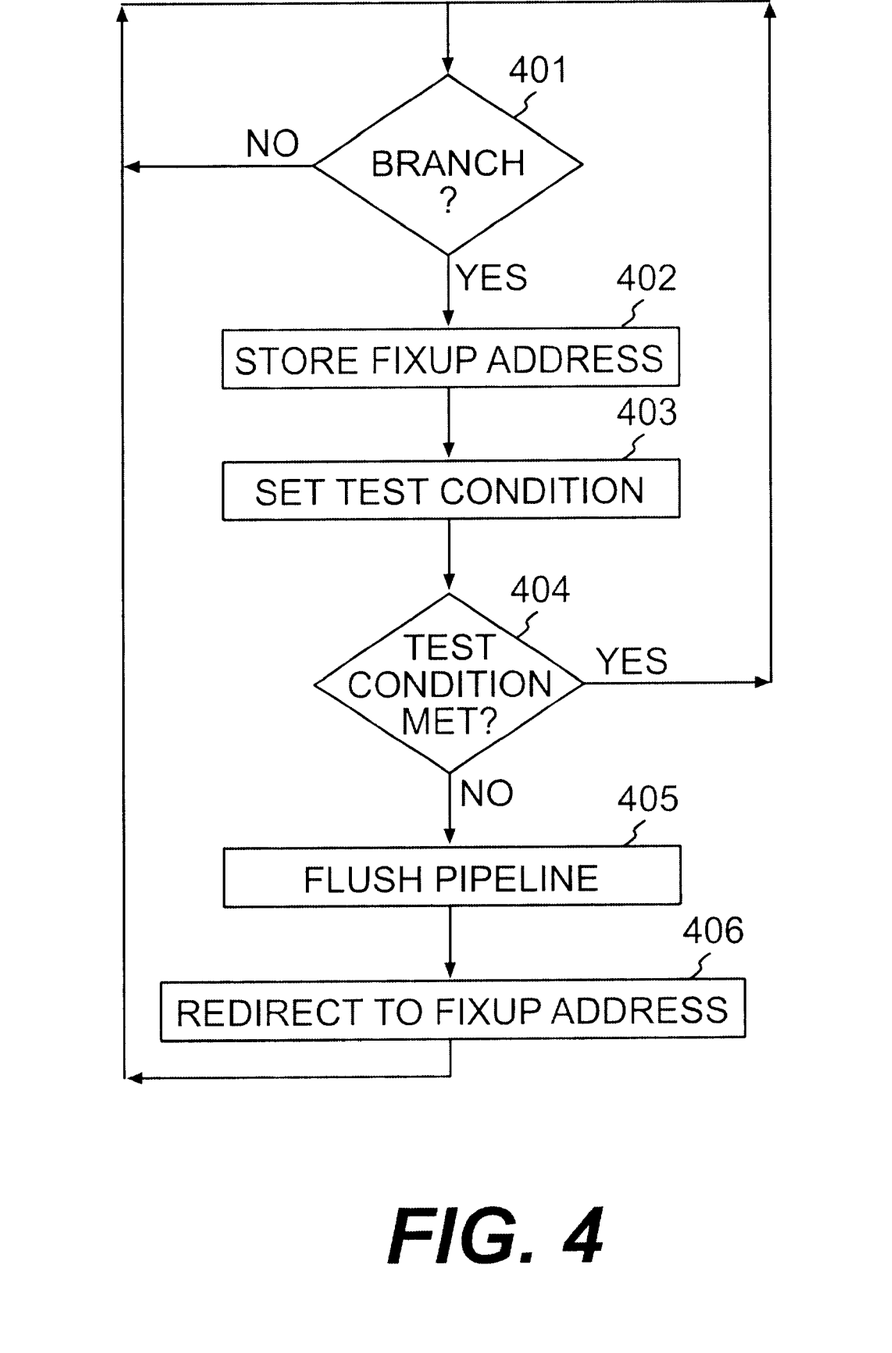
FIG. 4 is a flow diagram of the branch instruction implementation method in accordance with the principles of the present invention.

In particular, FIG. 4 shows a flow diagram of the branch instruction implementation method in accordance with the principles of the present invention. In step 401, a determination is made whether the instruction currently being decoded is a branch instruction. If it is determined, during step 401, that the current instruction being decoded is not a branch instruction, then the flow of the present inventive method returns to the step 401, and the process continues monitoring for a branch instruction.

If on the other hand, it is determined that a branch instruction is currently being decoded, a fix-up address of the branch instruction is formulated and stored in step 402. The fix-up address represents the remedial branch target, e.g., the address of the instruction to be executed in the event of a mispredicted target or branch condition.

A branch instruction may be broadly categorized into four categories shown in table I. The categories may be based on whether the branch happens conditionally or unconditionally, and whether the target of the branch is known or unknown at the time of decoding of the instruction.

TABLE I

| Branch Type | Features |
| --- | --- |
| Conditional/ Direct | Branch only when the condition is met. Branch target known at the time of decoding. |
| Conditional/ Indirect | Branch only when the condition is met. Branch target unknown at the time of decoding. |
| Unconditional/ Direct | Branch unconditionally. Branch target known at the time of decoding. |
| Unconditional/ Indirect | Branch unconditionally. Branch target unknown at the time of decoding. |

Since the unconditional/direct branch instruction requires no prediction of either whether the branch will take place or the target of the branch, it is the easiest instruction to decode and implement. Thus, for this case, a fix-up address can be any arbitrary address, e.g., the target address provided in the instruction itself.

For conditional/direct branch instructions, the fix-up address depends on what prediction with regard to whether the condition will be met is made during the decoding of the branch instruction. If it is predicted that the condition would be met, and thus the branch will occur, the fix-up address would be the address of the next sequential instruction following the branch instruction (i.e., the instruction that should be executed if the branch does not take place). On the other hand, if the decoder predicts that the branch would not take place, i.e., the next sequential instruction is scheduled for execution, the fix-up address is the address of the branch target provided in the branch instruction.

In one embodiment, the fix-up addresses for the direct branch instructions are stored in a Branch Resolution Table (BRT) 309 in a manner well known to those familiar with microprocessor systems and architectures.

For indirect microbranches, the fix-up address is sent from the execution pipeline 320 to the BRT 309 at the time a branch misprediction is detected. The branch instruction is decoded with a branch target predicted by the respective branch prediction mechanism of the ISAs in a manner well known to those familiar with microprocessor systems and architectures.

In a preferred embodiment of the present invention, for microbranches, the fix-up address can be stored as an information being tracked by the tracking pipeline 315, e.g., the microinstruction pointer (UIP) 317. For indirect macrobranches the fix-up address is sent from the execution pipeline 320 to the BRT 309 at the time a branch misprediction is detected.

Once the fix-up address is formulated and stored in the manner described above, in step 403, a test condition that will test whether the branch prediction was made correctly is set.

The test condition may be set to fail if: (1) the branch target was incorrectly predicted by the prediction hardware, or (2) if the branch condition was wrongly assumed, e.g. the branch was predicted to take place but did not actually take place. The test condition may comprise, e.g., a bit (or a plurality of bits) in a register. The register housing the test condition may be any register of the microprocessor system. The test condition may be equal to or not equal to a predetermined value.

After the test condition is set, in step 404, a determination is made by a test condition mechanism whether or not the test condition is met, i.e., whether the prediction made by the prediction hardware was correct. In the preferred embodiment, two alternative test condition mechanisms may be provided. One of the mechanisms allows the setting of a single test bit for comparison against a bit in a register, while the other mechanism allows the setting of a plurality of bits, e.g., 8, 16 or 32, etc., to be compared against a content of a register.

Although any mechanisms to test whether a predetermined condition is met can be used, according to an illustrative exemplary embodiment, the test condition mechanisms may be, e.g., new instructions added to the native ISA, and/or may be simple extensions of two existing instructions. One of these existing instructions compares a bit in a register value (TBIT, short for "test bit"), while the other existing instruction compares a register value with an immediate or another register (CMP, short for "compare").

The above comparison capabilities of the two existing instructions are used to test whether the test condition is met. In addition, the newly added instructions (that are preferably used as the test condition mechanisms) cause a pipeline flush if the condition is not met. Thus, in step 405, the test condition mechanism causes the pipeline to be flushed when the test condition has failed.

It can be appreciated that the immediate nature of the above flushing of the pipeline prevents any of the subsequent instructions remaining in the pipeline from being executed.

The above flushing of the pipeline as a result of the test condition comparison may be used as an indication that the branch prediction has failed, and that it is necessary to redirect the program flow to a new target address. Upon detection of the failure of the test condition, a redirect signal is sent to the Branch Resolution Table 309 and to the emulated ISA fetch control 303.

Figure 5:
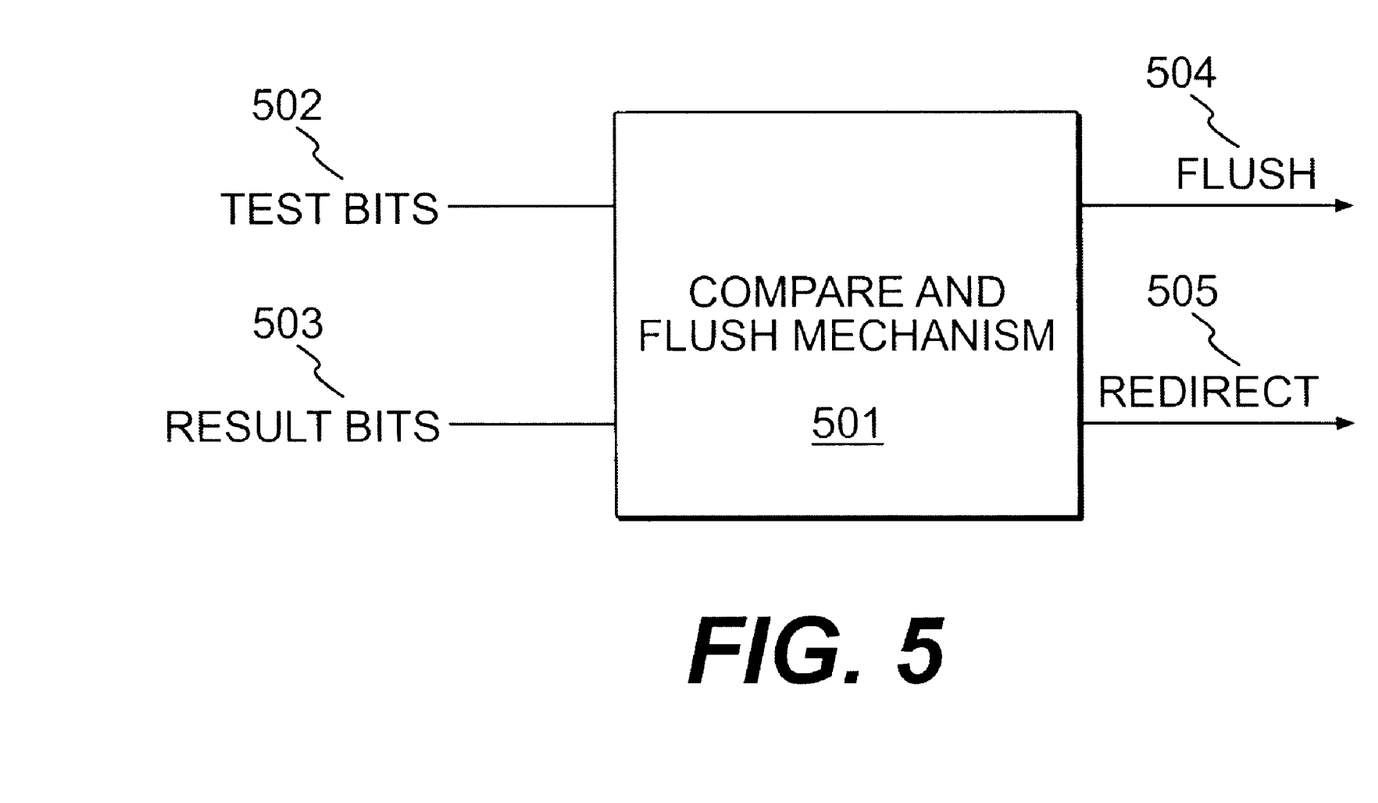
FIG. 5 is a block diagram of an exemplary embodiment of the conditional flush mechanism in accordance with the principles of the present invention.

For example, FIG. 5 shows a compare and flush mechanism 501 to implement the above described conditional flush mechanism. The test bits 502 are set to the predetermined value to facilitate the test condition and the comparison. The result bits 503 are the bits (or a single bit as it may be) of a register or of a field of an instruction, which are compared against the test bits 502. The test condition may be set to fail if, e.g., the comparison results in a match. The test condition, however, can be just as easily implemented to fail if the comparison results in a mismatch.

Upon a failure of the test condition, the conditional flush mechanism 501 sends a flush signal 504 to the pipeline controller, and sends a redirect signal 505 to the instruction fetch mechanism of the appropriate ISA hardware. The appropriate hardware is determined based on the value contained in the macro/micro field 316 of the tracking pipeline 315. The conditional flush mechanism 501 may be implemented as a combinational logic circuit having small number of gates, e.g., AND gates and/or OR gates, in a manner readily apparent to those familiar with logic circuit design.

Finally, in step 406, the appropriate program flow, either the macroinstruction flow or the microinstruction flow, is redirected to the instruction pointed to by the fix-up address. The instruction pointed to by the fix-up address was previously determined and stored.

For macrobranch indirect branch, the fix-up address is sent to the Branch Resolution Table at the time that the test condition failure is detected. The fix-up address is retrieved from the Branch Resolution Table (BRT) 309, and is used by the emulated ISA fetch control 303 to re-steer the program flow to the new address.

In a preferred embodiment, for microbranch mispredictions, the fix-up microinstruction pointer (UIP) 317 is used to restart the microinstruction sequencer at the fix-up target in the microinstruction flow.

The conditional flush mechanism 501 may be used to flush the pipeline to avoid the execution of stale instructions. A stale instruction is any instruction that remains in the pipeline when the fetch resources, e.g., the base pointer of an indirect fetch instruction, are changed by an earlier retiring instruction. And thus, the stale instruction should not have been fetched, and more importantly should not be executed. When an earlier retiring instruction changes the fetch resources, and thus requires the pipeline to be flushed, the conditional flush mechanism 501 may be presented with a condition that is known to fail, e.g., compare a zero (0) and a zero (0) set to result in a mismatch. The conditional flush mechanism 501 sends the flush signal 504 in response to the failed condition. The pipeline is thus immediately flushed without the usual delay associated with the detection and reporting of the stale condition to the control hardware, and waiting to receive a pipeline flush directive from the control hardware.

While the invention has been disclosed by reference to the details of preferred embodiments, it is understood that the disclosure is illustrative rather than limiting, and modifications will readily occur to those skilled in the art, within the spirit of the invention and the scope of the appended claims.

What is claimed is:

1. A method of implementing a branch instruction in a computer system having an execution pipeline, comprising:
   setting a test condition representing at least one of a correctness of a predicted target and a satisfaction of a branch condition;
   providing a conditional flush instruction, wherein the conditional flush instruction:
   compares test bits and result bits to determine whether said test condition is met; and immediately flushes said execution pipeline at a very next pipestage if said test condition is not met.

2. The method of implementing a branch instruction in accordance with claim 1, further comprising:
   storing a fix-up address, said fix-up address corresponding to a fix-up instruction to be executed when said test condition fails.

3. The method of implementing a branch instruction in accordance with claim 2, further comprising:
   causing said fix-up instruction to be fetched into said execution pipeline.

4. The method of implementing a branch instruction in accordance with claim 1, wherein:
   said test condition comprises a bit in a register being equal to a predetermined value.

5. The method of implementing a branch instruction in accordance with claim 1, wherein:
   said test condition comprises a register content being equal to an immediate field of an instruction in said execution pipeline.

6. The method of implementing a branch instruction in accordance with claim 1, wherein:

said fix-up address is stored in a Branch Resolution Table (BRT).

7. The method of implementing a branch instruction in accordance with claim 1, wherein:

said fix-up address is stored in a register.

8. The method of implementing a branch instruction in accordance with claim 1, further comprising:

providing a tracking pipeline having tracking information with respect to instructions being executed in said execution pipeline, and wherein said fix-up address is encoded in said tracking information.

9. An apparatus for implementing a branch instruction in a computer system having an execution pipeline and macroinstructions, comprising:

means for setting a test condition, said test condition representing at least one of a correctness of a predicted target and a satisfaction of a branch condition;

means for providing a conditional flush instruction, wherein the conditional flush instruction:

compares test bits and result bits to determine whether said test condition is met; and immediately flushes said execution pipeline at a very next pipestage if said test condition is not met.

10. The apparatus for implementing a branch instruction according to claim 9, further comprising:

means for storing a fix-up address, said fix-up address corresponding to a fix-up instruction to be executed when said test condition fails.

11. The apparatus for implementing a branch instruction according to claim 10, further comprising:

means for causing said fix-up instruction to be fetched into said execution pipeline.

12. The apparatus for implementing a branch instruction according to claim 9, wherein:

said test condition comprises a bit in a register being equal to a predetermined value.

13. The apparatus for implementing a branch instruction according to claim 9, wherein:

said test condition comprises a register content being equal to an immediate field of an instruction in said execution pipeline.

14. The apparatus for implementing a branch instruction according to claim 9, wherein:

said fix-up address is stored in a Branch Resolution Table (BRT).

15. The apparatus for implementing a branch instruction according to claim 9, wherein:

said fix-up address is stored in a register.

16. The apparatus for implementing a branch instruction according to claim 9, further comprising:

means for providing a tracking pipeline having tracking information with respect to instructions being executed in said execution pipeline, and wherein said fix-up address is encoded in said tracking information.

17. A method of executing instructions in a microprocessor having an execution pipeline and macroinstructions, comprising:

providing an instruction set, wherein the instruction set:

compares test bits and result bits to determine whether a predetermined condition is met; and immediately flushes said execution pipeline at a very next pipestage upon a failure of the predetermined condition.

18. The method of claim 17, further comprising:

using said instruction set to flush out a stale instruction.

* * * * *